(12) United States Patent
Brown et al.

(10) Patent No.: US 9,032,630 B2
(45) Date of Patent: May 19, 2015

(54) VEGETATION TRIMMER

(75) Inventors: Warren Brown, Victoria (AU); Harry Szommer, Victoria (AU); Graham Gerhardt, Victoria (AU)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 852 days.

(21) Appl. No.: 13/202,546

(22) PCT Filed: Feb. 11, 2010

(86) PCT No.: PCT/CN2010/070675
§ 371 (c)(1),
(2), (4) Date: Aug. 19, 2011

(87) PCT Pub. No.: WO2010/094239
PCT Pub. Date: Aug. 26, 2010

(65) Prior Publication Data
US 2012/0005905 A1    Jan. 12, 2012

(30) Foreign Application Priority Data

Feb. 20, 2009  (CN) .......................... 2009 1 0008072
Dec. 11, 2009  (CN) .......................... 2009 1 0260820

(51) Int. Cl.
*A01G 3/08*        (2006.01)
*B27B 17/08*       (2006.01)
(Continued)

(52) U.S. Cl.
CPC .............. *B27B 17/0058* (2013.01); *A01G 3/08* (2013.01); *B27B 17/08* (2013.01); *A01G 3/086* (2013.01)

(58) Field of Classification Search
CPC .. A01G 3/086; A01G 3/0335; B27B 17/0058; B27B 17/08; B27B 17/02; B27B 19/003

USPC ......................................... 30/134, 296.1, 383
See application file for complete search history.

(56) References Cited

U.S. PATENT DOCUMENTS 2,488,343 A * 11/1949 Standal .......................... 30/387
2,703,928 A *  3/1955 Southwick ..................... 30/386
(Continued)

FOREIGN PATENT DOCUMENTS

CN    1860844    11/2006
CN    1891028     1/2007
(Continued)

OTHER PUBLICATIONS

International Search Report of International Application No. PCT/CN2010/075212, dated Nov. 4, 2010.
(Continued)

*Primary Examiner* — Hwei C Payer
(74) *Attorney, Agent, or Firm* — Marshall, Gerstein & Borun LLP

(57) ABSTRACT

A vegetation pruning device includes a cutting element; a guide bar for supporting the cutting element, the guide bar having a guide bar plane, the guide bar being pivotable in the guide bar plane about a fixed axis; a motor having a motor shaft for rotatably driving the cutting element; a motor housing for receiving the motor; a guiding mechanism connected to the motor housing, the guiding mechanism having a longitudinal axis; a handle assembly operable to move linearly along the longitudinal axis; and a transmission device for connecting the handle assembly to the guide bar through, the transmission device converting a linearly movement of the handle assembly to a pivoting movement of the guide bar, the cutting element thereby approaching or withdrawing from a workpiece to be sawn.

30 Claims, 16 Drawing Sheets

(51) Int. Cl.
*B27B 17/02* (2006.01)
*B27B 17/00* (2006.01)

(56) References Cited

U.S. PATENT DOCUMENTS

| | | | |
|---|---|---|---|
| 3,343,613 A | | 9/1967 | Carnesecca et al. |
| 3,731,380 A | | 5/1973 | Mathiesen |
| 4,207,675 A | | 6/1980 | Causey et al. |
| 4,760,646 A | | 8/1988 | Siegler |
| 4,884,340 A | | 12/1989 | Newman |
| 5,013,282 A | | 5/1991 | Keller |
| 5,685,080 A | * | 11/1997 | Amano et al. ............ 30/383 |
| 5,826,341 A | * | 10/1998 | Massa ...................... 30/247 |
| 5,884,403 A | * | 3/1999 | Rogers .................... 30/296.1 |
| 6,148,524 A | | 11/2000 | Nitschmann |
| 6,619,171 B2 | * | 9/2003 | Wade et al. ............... 83/169 |
| 6,651,347 B2 | | 11/2003 | Uhl |
| 7,152,328 B2 | | 12/2006 | Champlin |
| 8,065,805 B2 | * | 11/2011 | Stones et al. ............ 30/378 |
| 2005/0022388 A1 | | 2/2005 | Stones et al. |
| 2005/0028374 A1 | * | 2/2005 | Stones et al. ............ 30/134 |
| 2005/0028378 A1 | * | 2/2005 | Stones et al. ............ 30/134 |
| 2006/0254063 A1 | | 11/2006 | Richards |
| 2007/0000138 A1 | | 1/2007 | Baskar et al. |
| 2012/0005905 A1 | * | 1/2012 | Brown et al. ............ 30/383 |
| 2012/0110863 A1 | * | 5/2012 | Brown et al. ............ 30/371 |

FOREIGN PATENT DOCUMENTS

| | | |
|---|---|---|
| CN | 201385333 | 1/2010 |
| CN | 201479651 | 5/2010 |
| DE | 29710381 U1 | 10/1998 |
| SU | 1340655 A1 | 9/1987 |
| WO | WO-201094239 A1 | 8/2010 |

OTHER PUBLICATIONS

International Search Report of International Application No. PCT/CN2010/070675, dated May 20, 2010.
European Search Report for Application No. 10799444.4 dated Oct. 15, 2013.
European Search Report for Application No. 10743420.1 dated Oct. 15, 2013.

* cited by examiner

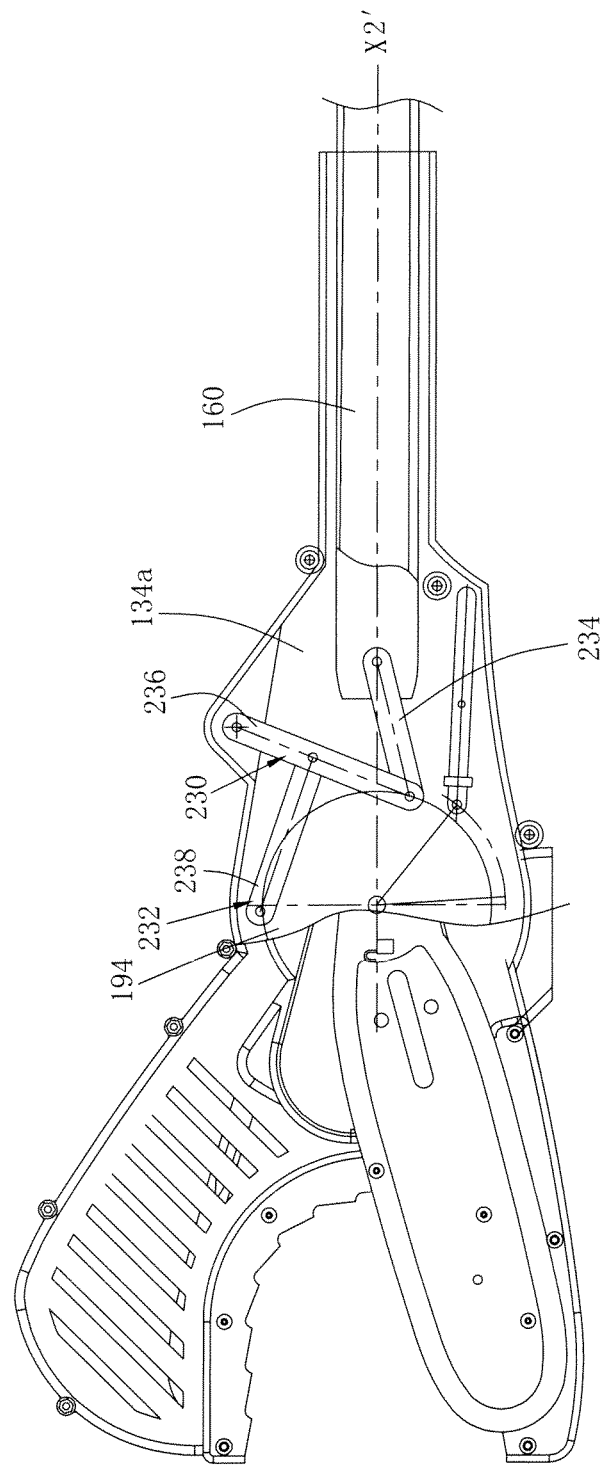

VEGETATION TRIMMER

CROSS-REFERENCE TO RELATED APPLICATIONS

This application is the entry into the U.S. National Phase of PCT/CN2010/070675, filed Feb. 11, 2010, which claims priority to Chinese Patent Application Nos. CN200910008072.X, filed Feb. 20, 2009 and CN200910260820.3, filed Dec. 11, 2009, each of which is incorporated herein in its entirety.

TECHNICAL FIELD

The present disclosure relates to a power tool, more particularly to a vegetation pruning device.

BACKGROUND

There are considerable array of tools available for the modern gardeners. For example, shears are used for pruning or cutting "light" vegetation such as grass or leaves or twigs etc. Hedge trimmers and chain saws are used for cutting "heavy" vegetation such as trees.

A traditional chain saw comprises a cutting head. The cutting head comprises a flexible chain and a guide bar for supporting the flexible chain. The flexible chain is driven by a motor received in a motor housing and runs along the peripheral of the guide bar. A traditional chain saw further comprises a main handle positioned behind the cutting head, an assistant handle positioned between the cutting head and the main handle. During cutting, the cutting head is driven by the motor and the flexible chain runs along the peripheral of the guide bar, the guide bar does not move with respect to the motor housing. In operation, one hand of the operator grasps the main handle, and the other hand of the operator grasps the assistant handle, the operator should press the saw toward the cutting direction to ensure smoothly cutting. When the cutting direction is from up to down, operating of the traditional chain saw will be not so hard for the gravity of the saw. But if the cutting is from down to up or from left side to right side, operating of the traditional saw will be very hard and need great effort.

U.S. Published Patent Application No. 2005/0022388A1 discloses a vegetation pruning device. The vegetation pruning device comprises a cutting head. The cutting head comprises a flexible chain and a guide bar for supporting the flexible chain. The flexible chain is driven by a motor and running around the guide bar. The vegetation pruning device further comprises a pair of pivotally coupled arms. The pivotally coupled arms rotate about a fixed axis. The cutting head is connected to one of the arm and can pivot together with the arm around the fixed axis relative to the other arm. Each arm is connected with a handle portion for the operator to grip. In use, the operator moves the handle portions close to each other, the arms will move close correspondingly, thereby the cutting work can be proceed. But this kind of vegetation pruning device makes that in some instance the operation is not so comfortable. For example, when you need to cut branch of high trees, it's hard to make such a cutting with this kind of vegetation pruning device. In other instance, such as cutting wood placed on the floor, the operator should bow, if the operating last long, it is very easy to feel exhaust.

SUMMARY

It is an aspect of the present invention to provide a vegetation pruning device with improved operability.

According to one aspect, a vegetation pruning device comprises:

a cutting element;

a guide bar for supporting the cutting element, the guide bar having a guide bar plane, the guide bar being pivotable in the guide bar plane about a fixed axis;

a motor having a motor shaft for rotatably driving the cutting element;

a motor housing for receiving the motor;

a guiding mechanism connecting with the motor housing, the guiding mechanism having a longitudinal axis, a handle assembly operable to move linearly along the longitudinal axis, and a transmission device for connecting the handle assembly to the guide bar, the transmission device converting a linearly movement of the handle assembly to a pivoting movement of the guide bar, the cutting element thereby approaching or withdrawing from a work piece to be sawn.

Preferably, the handle assembly moves linearly, which makes the operator feel comfortable in any working instance.

Advantageously, the transmission device may be configured as a crank mechanism.

Advantageously, the crank mechanism may comprise a driving part, a connecting part and a driven part, the driving part is operable by the handle assembly, the driven part is fixedly attached to the guide bar, the connecting part is interposed between the driving part and the driven part, the connecting part is hinged to the driving part and the driven part respectively.

Advantageously, the driven part may be configured as V-shaped, one side portion of the V-shaped driven part is hinged to the connecting part, another side portion of the V-shaped driven part is fixedly secured to the guide bar, a bottom portion of the V shaped driven part is pivotable about the fixed axis.

Advantageously, the fixed axis may be configured as the motor shaft axis.

Advantageously, the vegetation pruning device may comprise a driving device, the driving device is positioned between the motor shaft and the cutting element, the driving device includes a sprocket having a sprocket rotation axis, the sprocket is in meshing engagement with the cutting element so that the cutting element is running around the guide bar and the sprocket, the fixed axis is the sprocket rotation axis.

Advantageously, the handle assembly may comprise a leading portion and a gripping portion.

Advantageously, the leading portion may be configured as a longitudinal extension rod.

Advantageously, the gripping portion may be configured as D-shaped.

Advantageously, the guiding mechanism may be configured as a longitudinal extension tube having a longitudinal axis, the extension rod is movably received in the longitudinal extension tube, so that the extension rod can move linearly along the longitudinal axis of the longitudinal extension tube.

Advantageously, a locking device may be associated with the longitudinal extension tube and the front portion.

Advantageously, a control switch may be built into the D-shaped gripping portion.

Advantageously, a safety switch may be symmetrically attached to both outer ends of the D-shaped gripping portion.

Advantageously, the vegetation pruning device may comprise a U-shaped guard.

Advantageously, the guard may comprise a first receiving room and a second receiving room, and the cutting head is completely insertable into the first receiving room.

Advantageously, the cutting head may be at least partially insertable into the second receiving room.

Advantageously, the U-shaped guard may comprise a first and a second supporting edge, which are connected to each other by a third supporting edge, and the first, second and third supporting edge, and the first, second and the third supporting edges define together a U-shaped supporting edge.

Advantageously, the U-shaped guard may comprise a first end surface and a second end surface, the first end surface and the second end surface have a common plane, a supposed plane is perpendicular to the longitudinal axis and the fixed axis is positioned in the supposed plane, the longest distance between the points of the outermost layer of the cutting element and the supposed plane is less than or equal to the distance between the common plane of the first end surface and the second end surface and the supposed plane.

Advantageously, the transmission device may be configured as a rack and pinion mechanism, the rack and pinion mechanism comprising a gear fixedly secured to the guide bar and a rack fixedly secured to the handle assembly, the gear is in meshing engagement with the rack so that a linearly movement of the rack can be changed to pivotable movement of the gear.

Advantageously, the transmission device may be configured as a pulley mechanism, the pulley mechanism includes a pulley and a rope, the rope is mounted on the pulley, one end of the rope being fixed to the handle assembly, the other end of the rope being fixed to the motor housing, the pulley is fixedly coupled to the guide bar, so that a linearly movement of the handle assembly can be changed to a pivotable movement of the guide bar.

According to another aspect, a vegetation pruning device comprises:
- a cutting element;
- a guide bar for supporting the cutting element;
- a motor for rotatably driving the cutting element;
- a handle assembly operable to move linearly; and
- a transmission device positioned between the handle assembly and the guide bar, the transmission device converting a linear movement of the handle assembly to a pivoting movement of the guide bar;

the transmission device is associated with the motor and operable to drive the motor and guide bar to move together.

Preferably, the guide bar rotates with the motor together, which makes the vegetation pruning device reduce the precision requirements of installation during manufacture, and which makes the operator more comfortable during operation.

Advantageously, the vegetation pruning device may be configured as a chain saw.

Advantageously, the transmission device may be configured as a synchronous belt drive mechanism.

Advantageously, the handle assembly may comprise a gear rack, and the synchronous belt drive mechanism comprises a drive gear which meshes with the gear rack.

Advantageously, the synchronous belt drive mechanism may comprise a follower bracket, and the guide bar is fixed secured to the follower bracket.

Advantageously, the follower bracket may be fixed secured to the motor, thereby the motor rotates together with the follower bracket when the follower bracket rotates.

Advantageously, the vegetation pruning device may further comprise a limiting mechanism for preventing the guide bar rotating to excess.

Advantageously, the limiting mechanism may comprise a limited bracket with three waist-shaped grooves formed along the circumference at equal interval, and the motor comprises three projected columns formed at one end along the circumference at equal interval, the three projected columns extending along the motor shaft and passing through the three waist-shaped grooves respectively.

Advantageously, the vegetation pruning device further may comprise a resilience mechanism.

Advantageously, the vegetation pruning device further may comprise a main housing, the transmission device being configured as a synchronous belt drive mechanism, the synchronous belt drive mechanism comprising a follower bracket, the resilience mechanism comprising a pin and a spiral spring, one end of the spiral spring being connected with the follower bracket pivotally, the other end of the spiral spring is provided with a chute, the main body comprising a projected column accommodated in the chute, the spiral spring being mounted on the pin, one end of the spiral spring supported against the projected columns, and the other end of the spiral spring being pressed against the end of the pin so as to be pressed against the follower bracket.

Advantageously, the transmission device may be configured as a plane multi-rod mechanism.

BRIEF DESCRIPTION OF THE DRAWINGS

FIG. 18 is a perspective view of the chain saw in accordance with the fifth embodiment.

DETAILED DESCRIPTION

The First Embodiment

Figure 1:
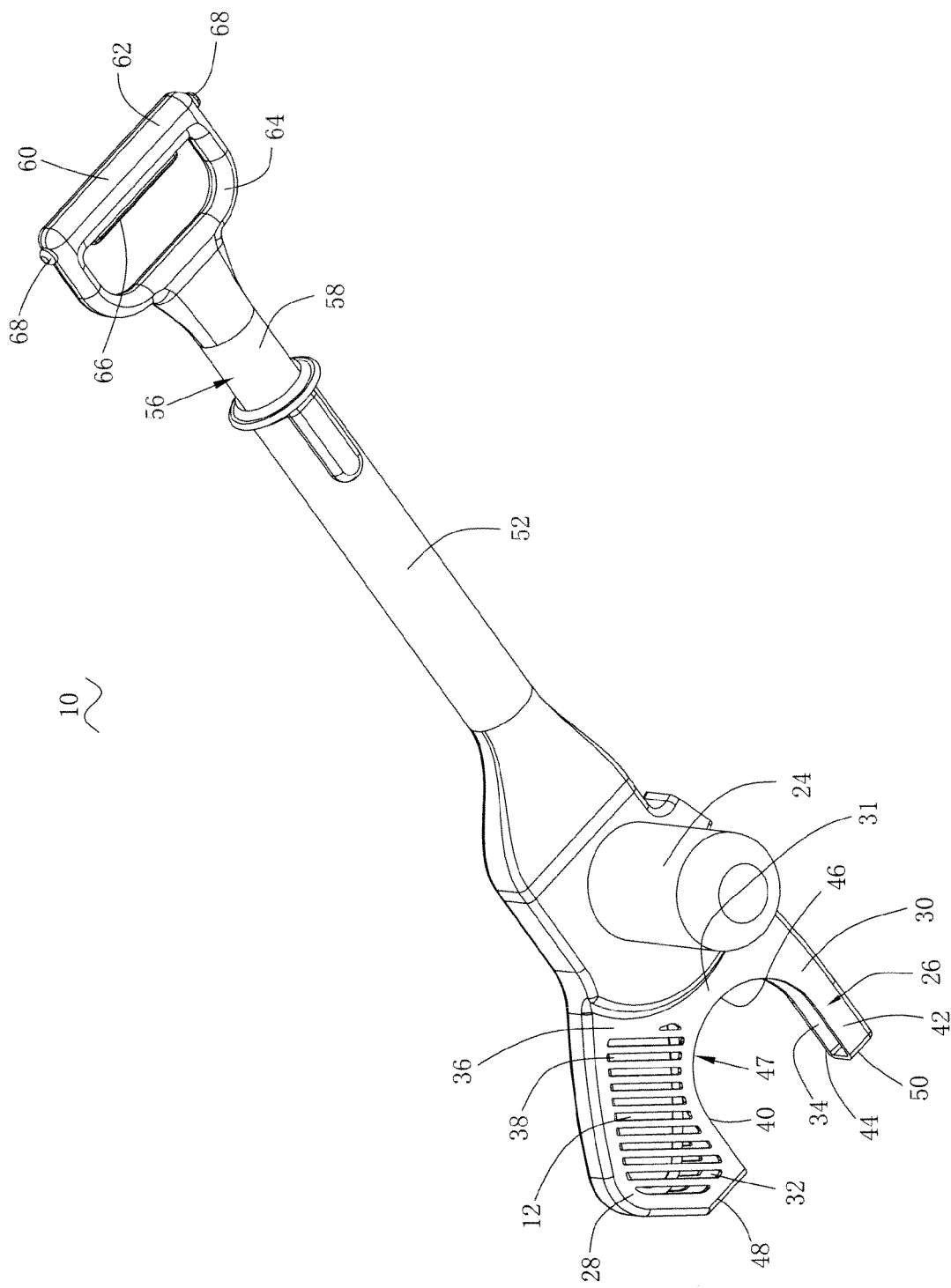
FIG. 1 is a perspective view of the pruning device in the form of a chain saw in accordance with the first embodiment.
Figure 2:
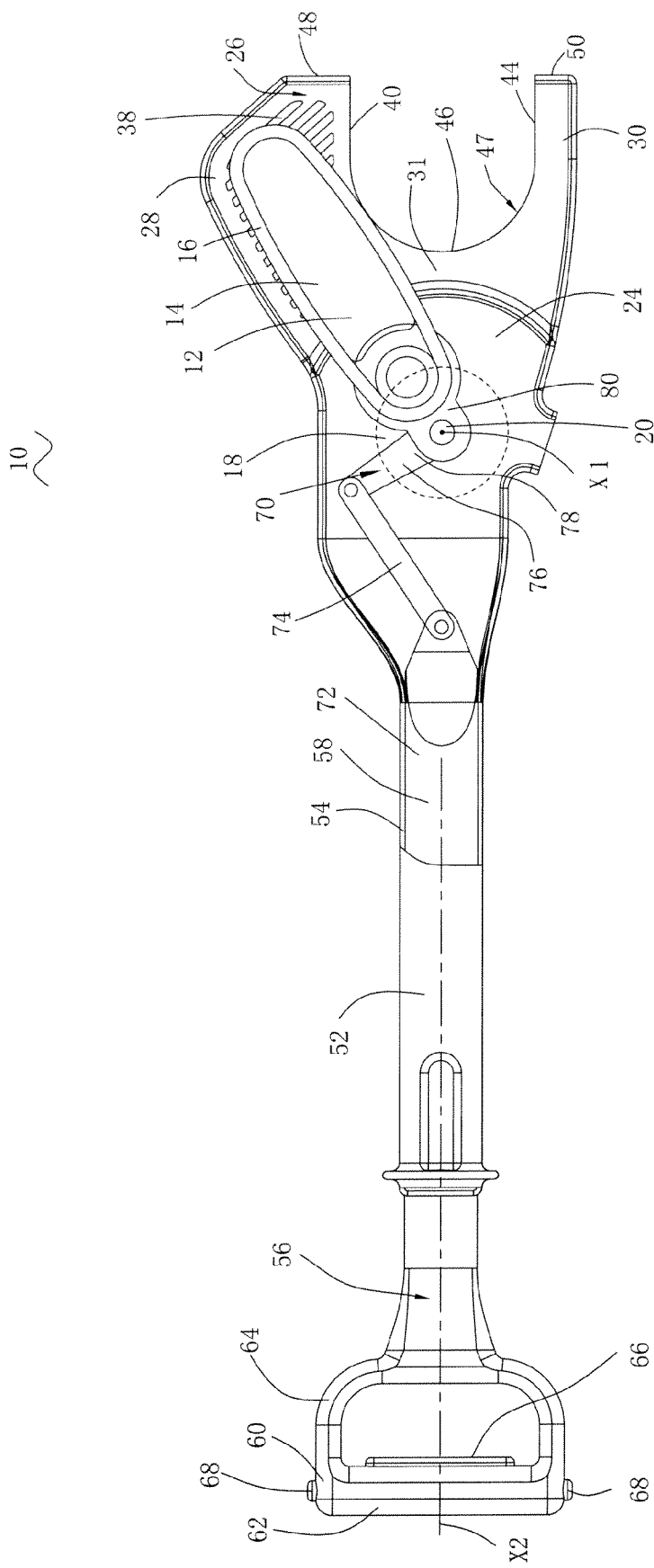
FIG. 2 shows schematically the internal mechanism of the chain saw according to FIG. 1.

Referring to FIG. 1 and FIG. 2, a pruning device in the form of a chain saw 10 comprises a cutting head 12 for working on a workpiece. The cutting head 12 comprises a guide bar 14 and a cutting element mounted on the guide bar 14. In present embodiment, the cutting element is a flexible chain 16. The flexible chain 16 is mounted on the periphery of the guide bar 14. The flexible chain 16 runs along the periphery of the guide bar 14. The guide bar 14 has a guide bar plane.

The chain saw 10 comprises a motor 18 for driving the cutting head 12 so that the flexible chain 16 runs around the guide bar 14. The motor 18 has a motor shaft 20. The motor shaft 20 has a motor shaft axis X1. The motor shaft 20 rotates about the motor shaft axis X1 thereby to drive the flexible chain 16 running around the guide bar 14.

The motor 18 is received in a motor housing 24. In present embodiment the motor housing 24 is building up from two half shells. However the motor housing is not limited to such a specific form, it can be other usual forms in the present field.

An U-shaped guard 26 is connected to one end of the motor housing 24. One side of the U-shaped guard 26 is an upper guard 28. The other side of the U-shaped guard 26 is a lower guard 30. The bottom portion of the U-shaped guard 26 is a coupling portion 31. The U-shaped guard 26 connects with the motor housing 24 by the coupling portion 31. The upper guard 28 has a first receiving room 32. The cutting head 12 is totally housed in the first receiving room when the chain saw 10 is not in use. The lower guard 30 has a second receiving room 34. The cutting head 12 can be partially received in the second receiving room 34 of the lower guard 30 when the cutting operation is near to end. The upper guard 28 has a pair of side walls 36. The guide bar 14 is positioned between the pair of side walls 36. A plurality of openings 38 are formed on the side walls 36. The opening 38 is used for observing the movement of the cutting head 12, so that the operator know clearly the current position of the cutting head 12. The side walls 36 has a first supporting edge 40 formed on the side near the lower guard 30. The lower guard 30 has a pair of side walls 42. The cutting head 12 is operable to receive between the pair of side walls 42. The side walls 42 has a second supporting edge 44 formed on the side near the upper guard 28. The coupling portion 31 has a third supporting edge 46 formed thereon. The third supporting edge 46 is used for connecting the first supporting edge 40 and the second supporting edge 44. The first supporting edge 40, the second supporting edge 44 and the third supporting edge 46 together defines a substantially U-shaped supporting edge 47. In use the U-shaped supporting edge 47 is used to support the workpiece.

The upper guard 28 has a first end surface 48. The lower guard 30 has a second end surface 50. In the present embodiment, the first end surface 48 and the second end surface 50 have a common plane. However, the first end surface 48 and the second end surface 50 can be in different plane respectively. For example, the first end surface 48 and the second end surface 50 are two paralleling planes. The first end surface 48 or the second end surface 50 may be curved surface, such as cone-shaped surface. The first end surface 48 is perpendicular to the side walls 36. The second end surface is perpendicular to the side walls 42. The first end surface 48 and/or the second end surface 50 might not perpendicular to the side walls 36 and/or the side walls 40. The first receiving room 32 is defined by the first end surface 48 and the side walls 36. The second receiving room 34 is defined by the second end surface 50 and the side walls 42.

A guiding mechanism is connected to the other end of the motor housing 24. In the present embodiment, the guiding mechanism is served by a longitudinal extension tube 52. The longitudinal extension tube 52 has a longitudinal axis X2. The longitudinal extension tube 52 has a receiving cavity 54.

The chain saw 10 further comprises a handle assembly 56. The handle assembly 56 comprises leading portion 58 and gripping portion 60. The leading portion 58 is a longitudinal extension rod. The leading portion 58 is received in the receiving cavity 54 of the longitudinal extension tube 52. The gripping portion 60 looks like a substantially D-shape. The D-shaped gripping portion 60 has a grasping side 62 and a connecting side 64. A control switch 66 is building in the inner part of the grasping side 62. The control switch 66 is electrically connected to the motor 18 to control the start and stop of the motor 18. A pair of safety switches 68 is symmetrically attached to both ends of the grasping side 62, such a construction makes that operation is becoming convenient no matter what hand is used. The connecting side 64 couples the leading portion 58.

A transmission device is positioned between the handle assembly 56 and the cutting head 12. In the present embodiment, the transmission device is provided to connect the handle assembly 56 and the guide bar 14 directly. The transmission device is served to change the linearly movement of the handle assembly 56 to the pivoting movement of the guide bar 14. In the present embodiment, the transmission device is a crank mechanism 70. The crank mechanism 70 includes driving part 72, connecting part 74 and driven part 76. The driving part 72 is served by the leading portion 58 of the handle assembly 56. The leading portion 58 moves linearly along the longitudinal axis X2 of the longitudinal extension tube 52 when the operator pushes the gripping portion 60 toward the cutting head 12. The driven part 76 is fixedly attached to the guide bar 14. The connecting part 74 is interposed between the driving part 72 and the driven part 76. The connecting part 74 is hinged to the driving part 72 and the driven part 76 respectively. The driven part 76 looks like a substantially V-shape. One side portion 78 of the V-shaped driven part 76 is hinged to the connecting part 74. The other side portion 80 of the V-shaped driven part 76 is fixedly secured to the guide bar 14. The bottom portion 81 of the V-shaped driven part 76 is pivotably mounted on the motor shaft 20, thereby the driven part 76 can rotate around the motor shaft axis X1 of the motor shaft 20. Because the driven part 76 is fixedly secured to the guide bar 14, when the driven part 76 rotates around the motor shaft axis X1, the guide bar 14 rotates together therewith about the motor shaft axis X1 in the guide bar plane.

Figure 3:
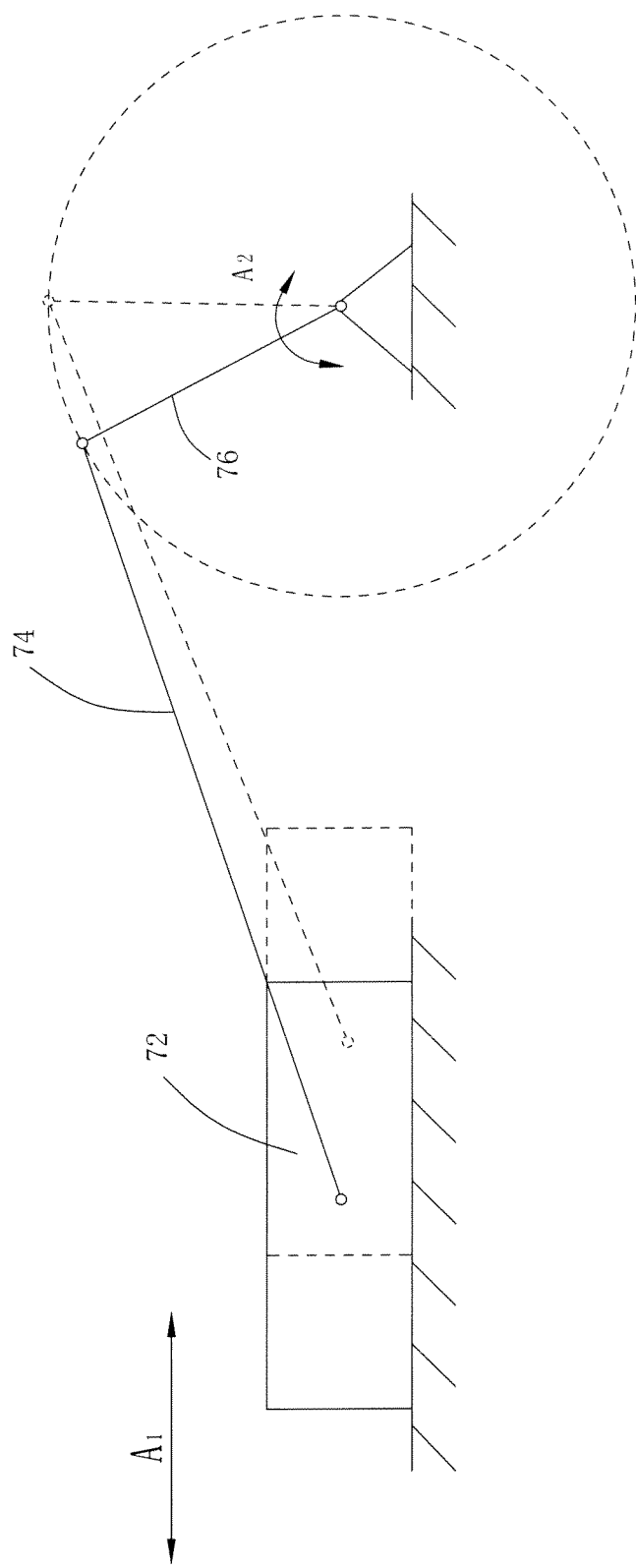
FIG. 3 shows principle diagram of the crank mechanism of the chain saw according to FIG. 1.

FIG. 3 discloses the principle diagram of the crank mechanism 70. The driving part 72 moves linearly. The driven part 76 pivots from the first position (solid line for reference) to the second position (broken line for reference) when the driving part 72 moves from the first position (solid line for reference) to the second position (broken line for reference). The moving direction of the driving part 72 is represented by arrow A1. The moving direction of the driven part 76 is represented by arrow A2.

Figure 4:
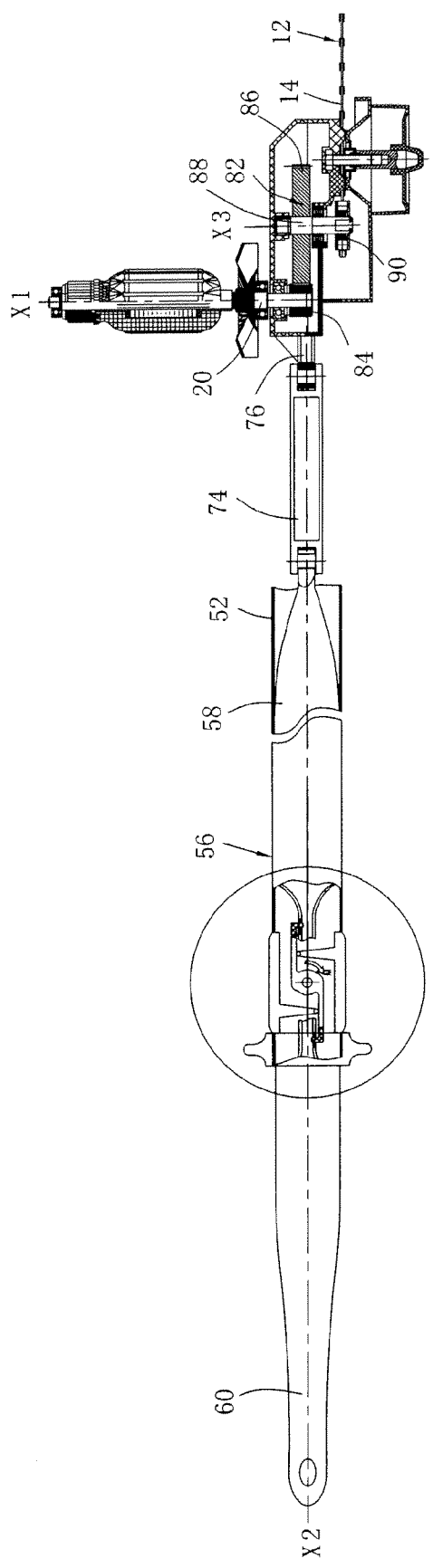
FIG. 4 is a schematic view of the driving device of the chainsaw according to FIG. 1.

Referring to FIG. 4, the chain saw 10 comprises a driving device 82 positioned between the motor 18 and the cutting head 12. The driving device 82 includes pinion 84 formed on the motor shaft 20. The pinion 84 can rotate together with the motor shaft 20 about the motor shaft axis X1. The driving device 82 further comprises a gear 86 in meshing engagement with the pinion 84. The gear 86 is mounted to a middle shaft 88. The middle shaft 88 has middle shaft axis X3. A sprocket 90 is mounted on the middle shaft 88 also. The sprocket 90 has sprocket rotation axis. In the present embodiment, the sprocket rotation axis is middle shaft axis X3. The sprocket 90 and the gear 86 together rotate about the middle shaft axis X3. The sprocket 90 is in meshing engagement with the flexible chain 16 to drive the flexible chain 16 running around the guide bar 14.

In use, switch on the chain saw 10, the motor shaft 20 will rotate. The pinion 84 rotates together with the motor shaft 20. The pinion 84 drives the gear 86 to rotate. The gear 86 and the sprocket 90 are mounted coaxially, so the sprocket 90 will rotate together with the gear 86. The sprocket 90 then drives the flexible chain 16 to run around the guide bar 14. The operator grasps the gripping portion 60 of the handle assembly 56 and pushes the handle assembly 56 toward the cutting head 12, the leading portion 58 will move linearly along the longitudinal axis X2 of the longitudinal extension tube 52, then the driven part 76 can pivot around the motor shaft 20, thereby drives the guide bar 14 pivoting about the motor shaft 20 in the guide bar plane. In the present embodiment, the cutting operation is achieved by pushing the handle assembly 56 toward the cutting head 12 to pivot the guide bar 14. It should be noted that ordinary skilled person in the present field can change the placement of the crank mechanism, so that cutting operation can be achieved by pulling the handle assembly 56 away from the cutting head 12.

Figure 5:
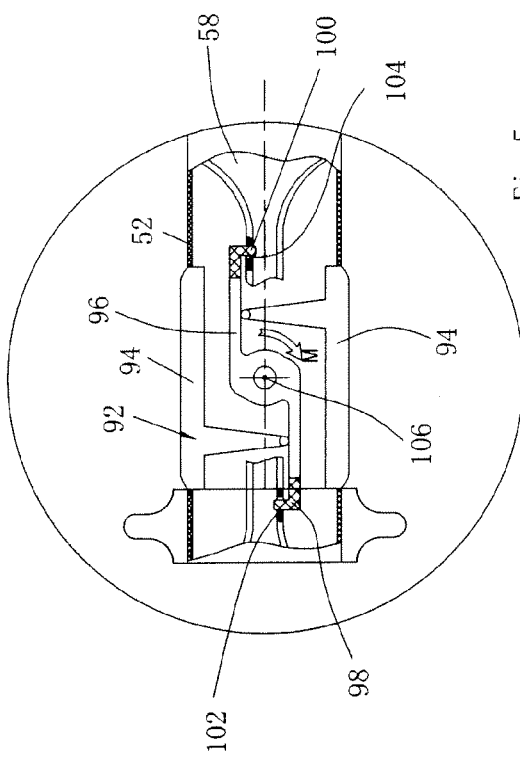
FIG. 5 is a schematic view of the locking device of the chainsaw according to FIG. 4.

Further referring to FIG. 5, a locking device 92 is attached to the longitudinal extension tube 52 and the leading portion 58 of the handle assembly 56. The locking device 92 comprises a pair of push buttons 94 oppositely attached thereon and a locking block 96 interposed between the push buttons 94. The locking block 96 comprises a first locking end 98 and a second locking end 100. The leading portion 58 comprises a first aperture 102 and a second aperture 104 for receiving the first locking end 98 and the second locking end 100 respectively. The locking block 96 has a pivoting axis 106. The locking block 96 can pivot about the pivoting axis 106 by press either of the push button 94, thereby the first locking end 98 and the second locking end 100 comes out from the first aperture 102 and the second aperture 104 respectively, thereby the leading portion 58 of the handle assembly 56 can move relative to the longitudinal extension tube 52, or vice versa.

Figure 6A:
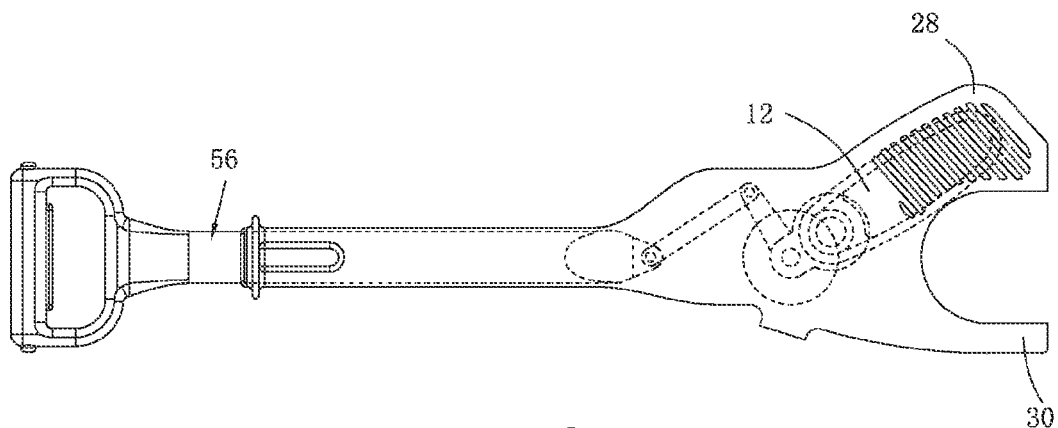
FIG. 6A is a schematic view of the chainsaw in unused status according to FIG. 1.
Figure 6B:
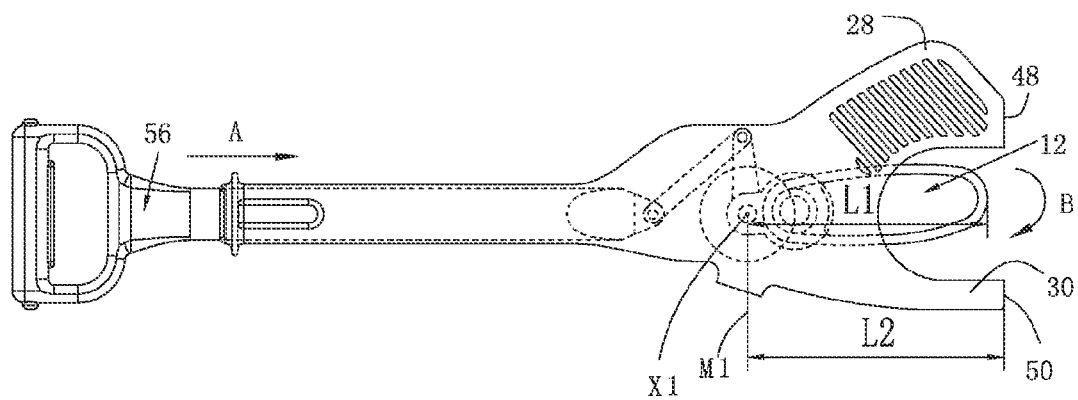
FIG. 6B is a schematic view of the chainsaw during operating status according to FIG. 1.
Figure 6C:
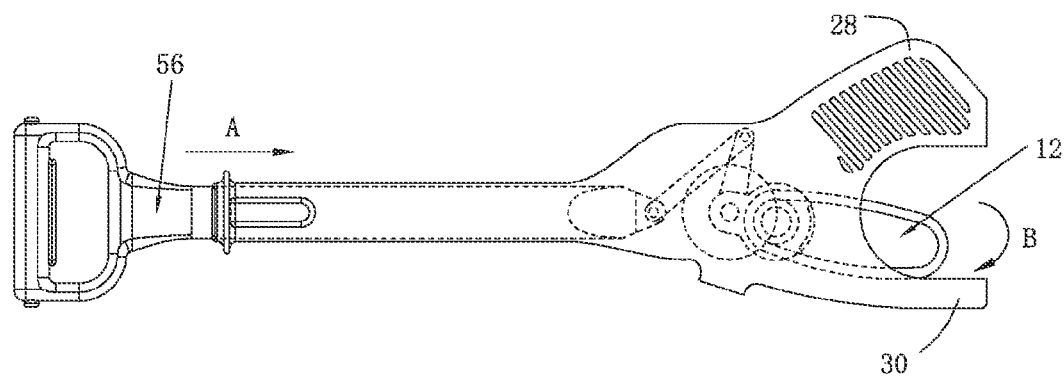
FIG. 6C is a schematic view of the chainsaw in an operating status near to end according to FIG. 1.

FIG. 6A, FIG. 6B and FIG. 6C illustrate the chain saw 10 in different operating process. FIG. 6A shows the chain saw 10 in unused status. When the chain saw 10 is not in use, the cutting head 12 is totally received inside the upper guard 28. Referring to FIG. 6B, push the handle assembly 56 along the direction of arrow A, the cutting head 12 will pivot along the direction represented by arrow B and start cutting the workpiece when coming out therefrom gradually. Referring to FIG. 6C, keep pushing the handle assembly 56 along the direction represented by arrow A, the cutting head 12 will pivot along the direction represented by arrow B continuously and enter into the lower guard 30 so to end the cutting operation.

Figure 7:
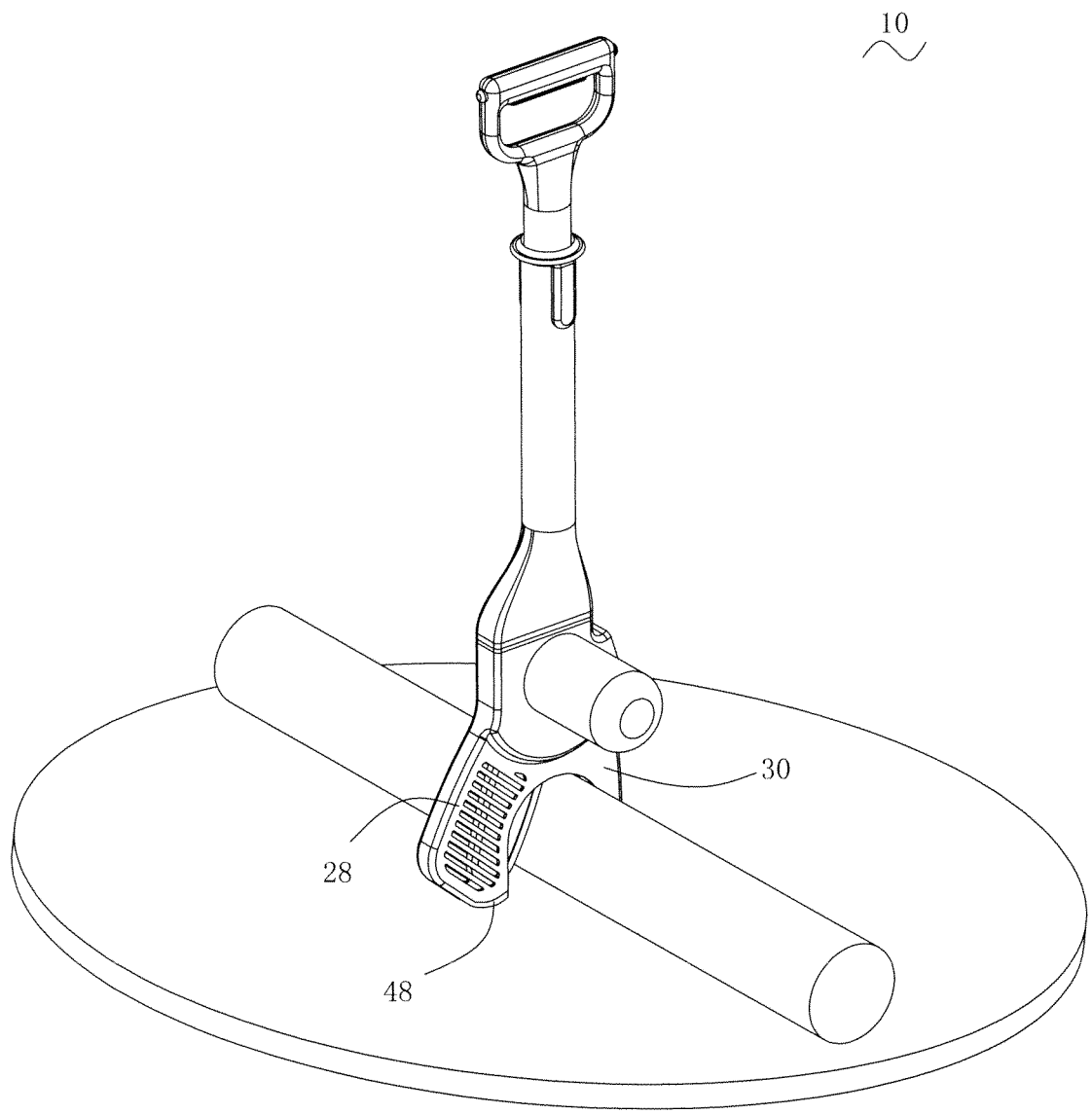
FIG. 7 is a schematic view of the chainsaw when cutting a workpiece placed on the floor according to FIG. 1.

Further referring to FIG. 6B and FIG. 7, the cutting head 12 comprises a proximal end near the motor shaft 20 and a distal end away from the motor shaft 20. The outermost layer of the distal end is the periphery of the flexible chain. The pivoting axis of the guide bar 14 is the motor shaft axis X1. Here a supposed plane M1 is perpendicular to the longitudinal axis X2 and the motor shaft axis X1 is located therein. The longest distance between the points in the outermost layer of the distal end of the cutting head and the supposed plane M1 is L1. If the first end surface 48 of the upper guard 28 and the second end surface 50 of the lower guard 30 are positioned in a common plane, the distance between the common plane and the supposed plane M1 is L2. If the first end surface 48 of the upper guard 28 and the second end surface 50 of the lower guard 30 are positioned in different plane, the longest distance between points in the first end surface 48 of the upper guard 28 or the second end surface 50 of the lower guard 30 and the supposed plane M1 is L2.

In the present embodiment, distance L1 is shorter than distance L2. The advantage of such a design is: when the workpiece is placed on the floor (see FIG. 7), the chain saw is holded by the operator in a direction that the longitudinal axis of the chain saw 10 perpendicular to the floor. The first end surface 48 and the second end surface 50 contacts with the floor to support the chain saw 10 thereon, thereby the distal end of the cutting head 12 will not touch the floor so as to protect the cutting head 12. In some instance, when the workpiece is placed on the grassland or sandlot, distance L1 can be equal to or a little longer than the distance L2, under this circumstance, the outermost layer of the cutting head 12 may touch the soft grassland or sandlot, however the soft grassland or sandlot will not make damage to the cutting head 12.

The Second Embodiment

Figure 8:
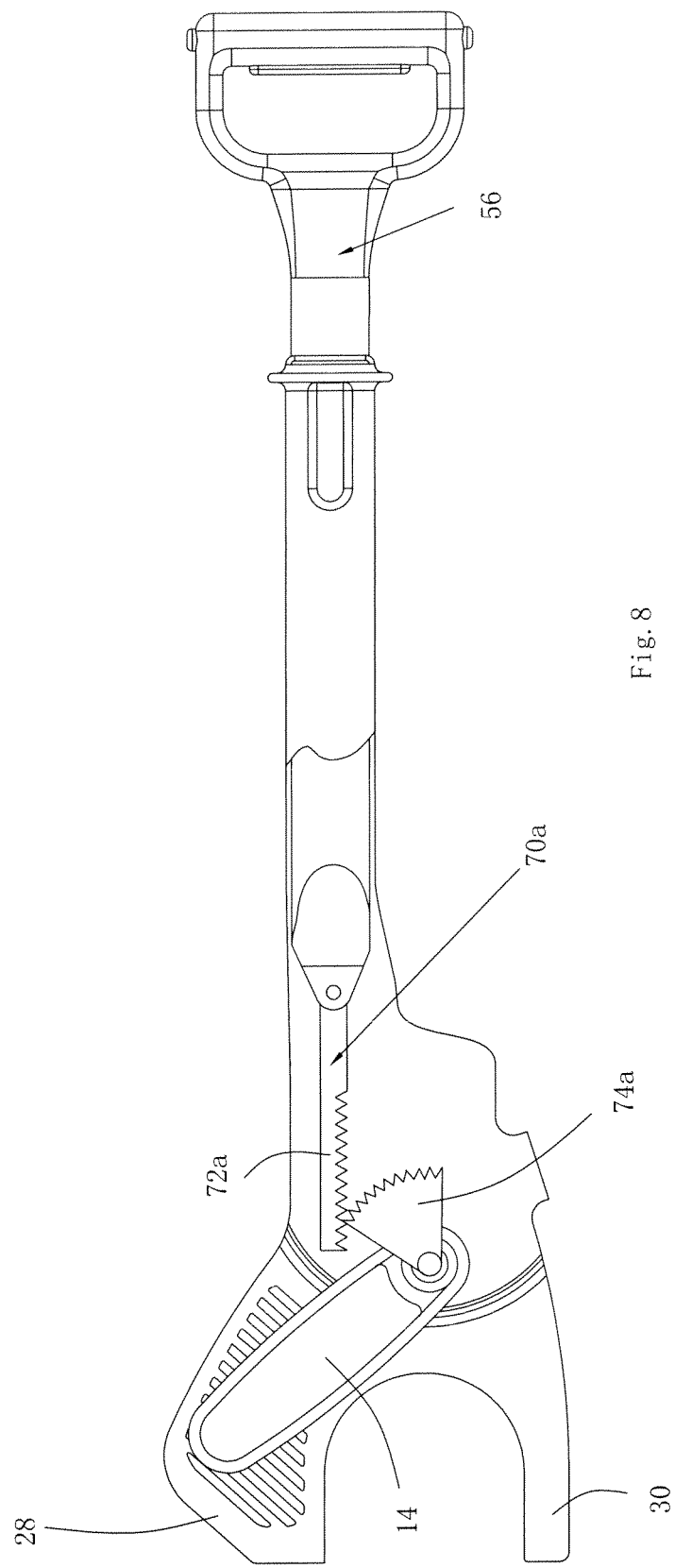
FIG. 8 is a schematic view of the internal mechanism of the chainsaw in accordance with the second embodiment.

FIG. 8 illustrates a second embodiment similar to the first embodiment, yet in which the crank mechanism 70 is replaced by a rack and pinion mechanism 70a. The rack and pinion mechanism 70a comprises a rack 72a fixedly secured to the handle assembly 56 and a gear 74a fixedly secured to the guide bar 14. Pushing or pulling the handle assembly 56 will cause the gear 74a to rotate so to initiate a pivoting movement of the guide bar 14.

The Third Embodiment

Figure 9:
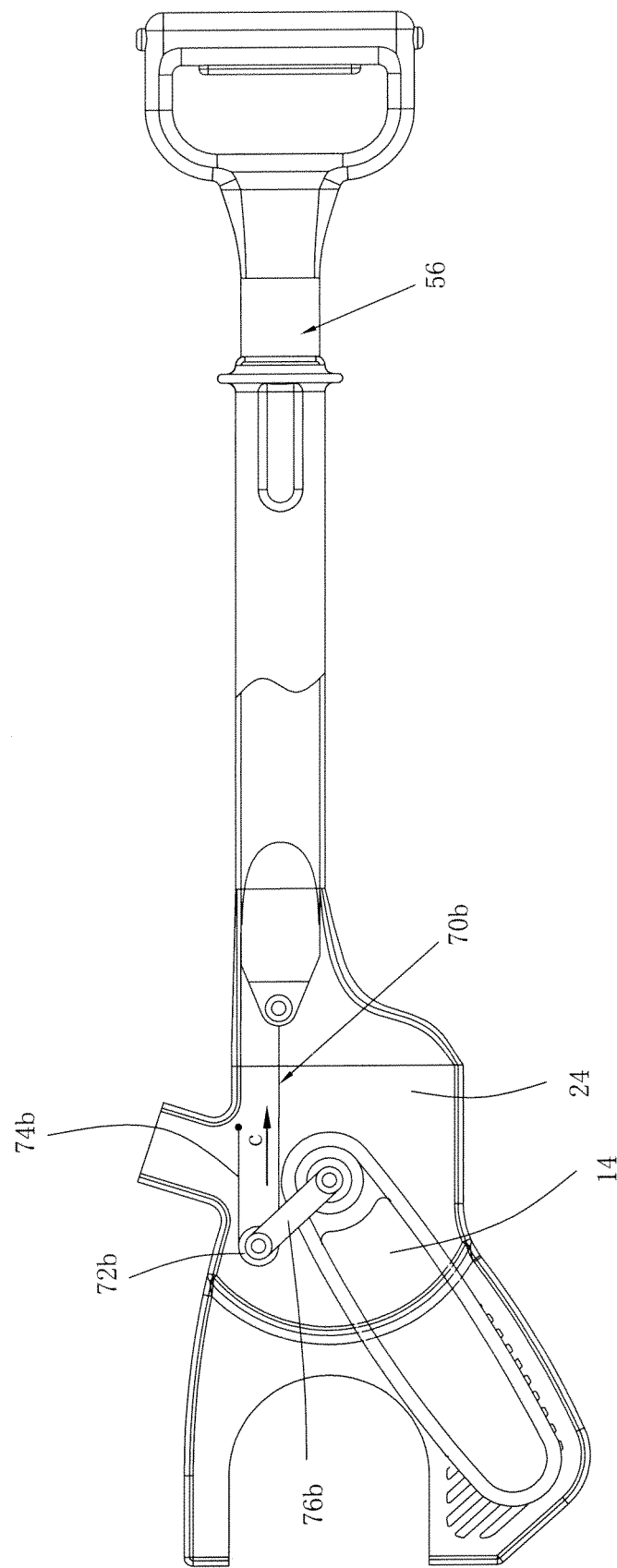
FIG. 9 is a schematic view of the internal mechanism of the chainsaw in accordance with the third embodiment.

FIG. 9 illustrates a third embodiment similar to the first embodiment, yet in which the crank mechanism 70 is replaced by a pulley mechanism 70b. The pulley mechanism 70b includes a pulley 72b and a rope 74b. The rope 74b is mounted on the pulley 72b. One end of the rope 74b is fixed to the handle assembly 56. The other end of the rope 74b is fixed to the motor housing 24. The pulley 72b is fixedly coupled to the guide bar 14 through a connecting rod 76b. In use, the operator pulls the handle assembly 56 in the direction represented by arrow C, which will cause the pulley 72b to rotate and the connecting rod 76b will rotate together therewith. The pivoting of the guide bar 14 will be initiated by the rotating of the connecting rod 76b.

The Fourth Embodiment

Figure 10:
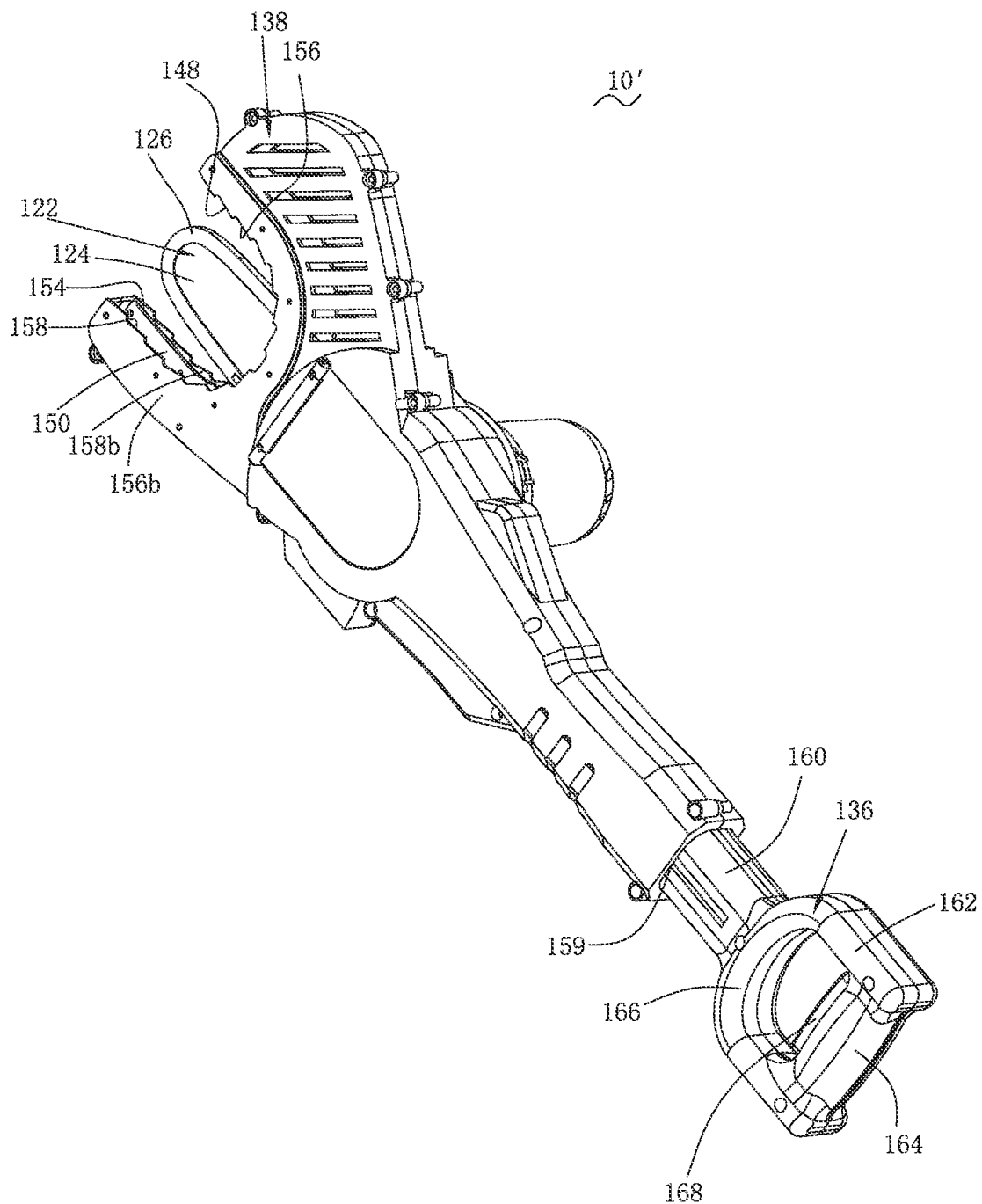
FIG. 10 is a perspective view of the chain saw in accordance with the fourth embodiment.
Figure 11:
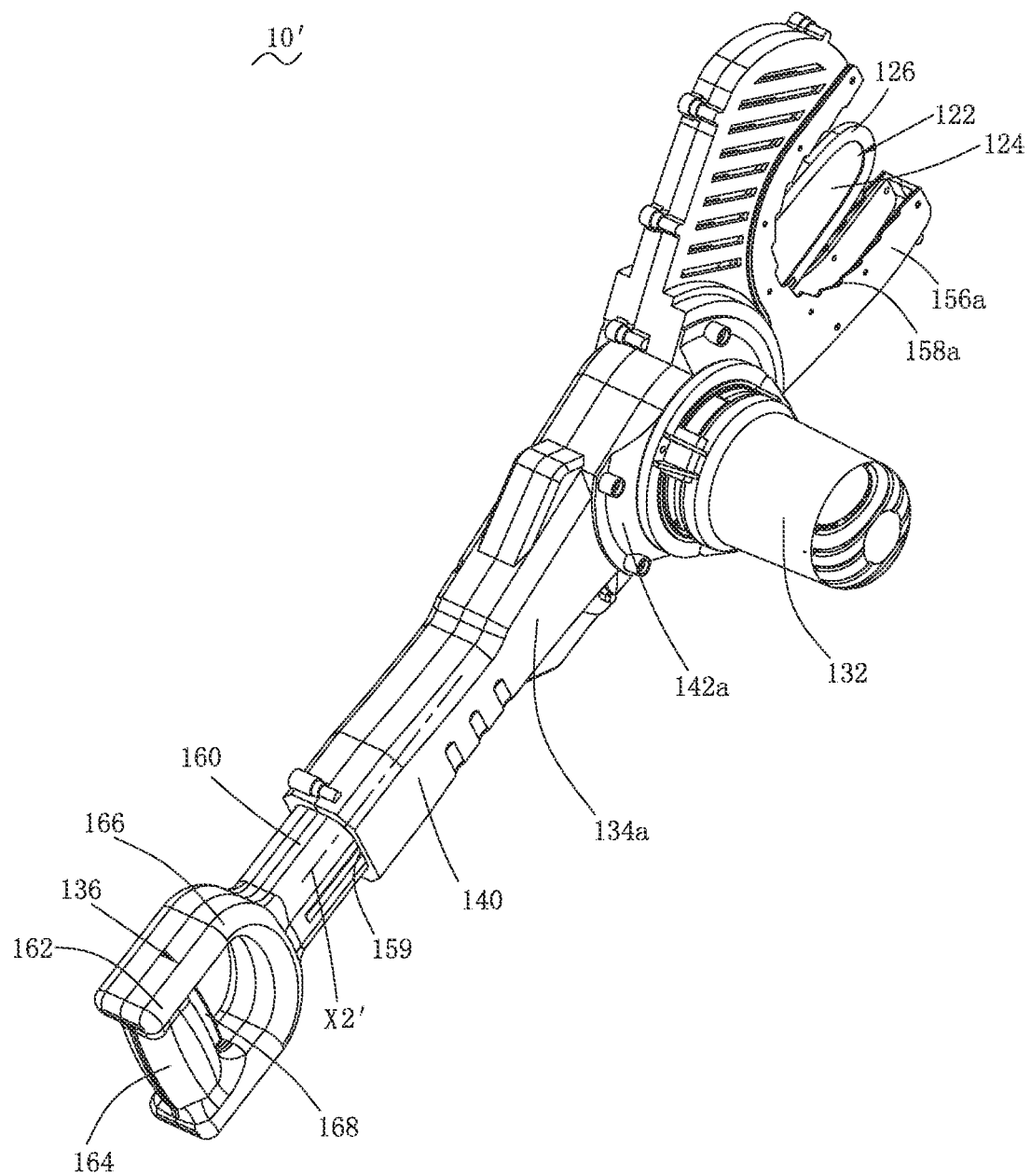
FIG. 11 is a schematic view of the chainsaw viewed from another visual angle according to FIG. 10.

Referring to FIG. 10 and FIG. 11, a chain saw 10' comprising a working head 122 for processing a workpiece, the working head 122 comprising a guide bar 124 and a cutting element mounted on the guide bar 124. The cutting element is a flexible chain 126 which is mounted on the periphery of the guide bar 124 and can rotate around the guide bar 124. The plane where the guide bar 124 exists is a guide bar plane.

Figure 12:
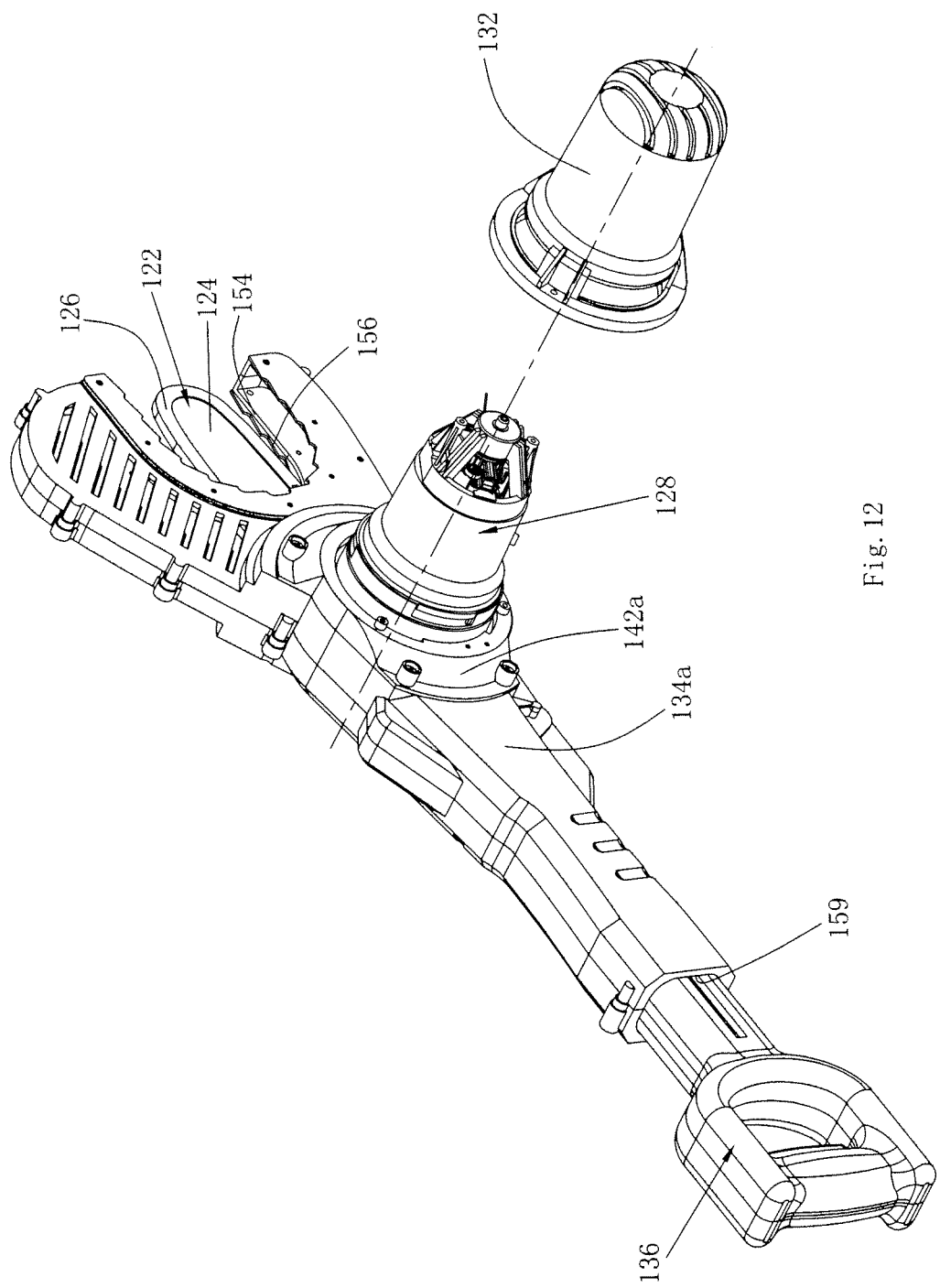
FIG. 12 is an exploded view of the chain saw when the motor housing is detached according to FIG. 10.
Figure 13:
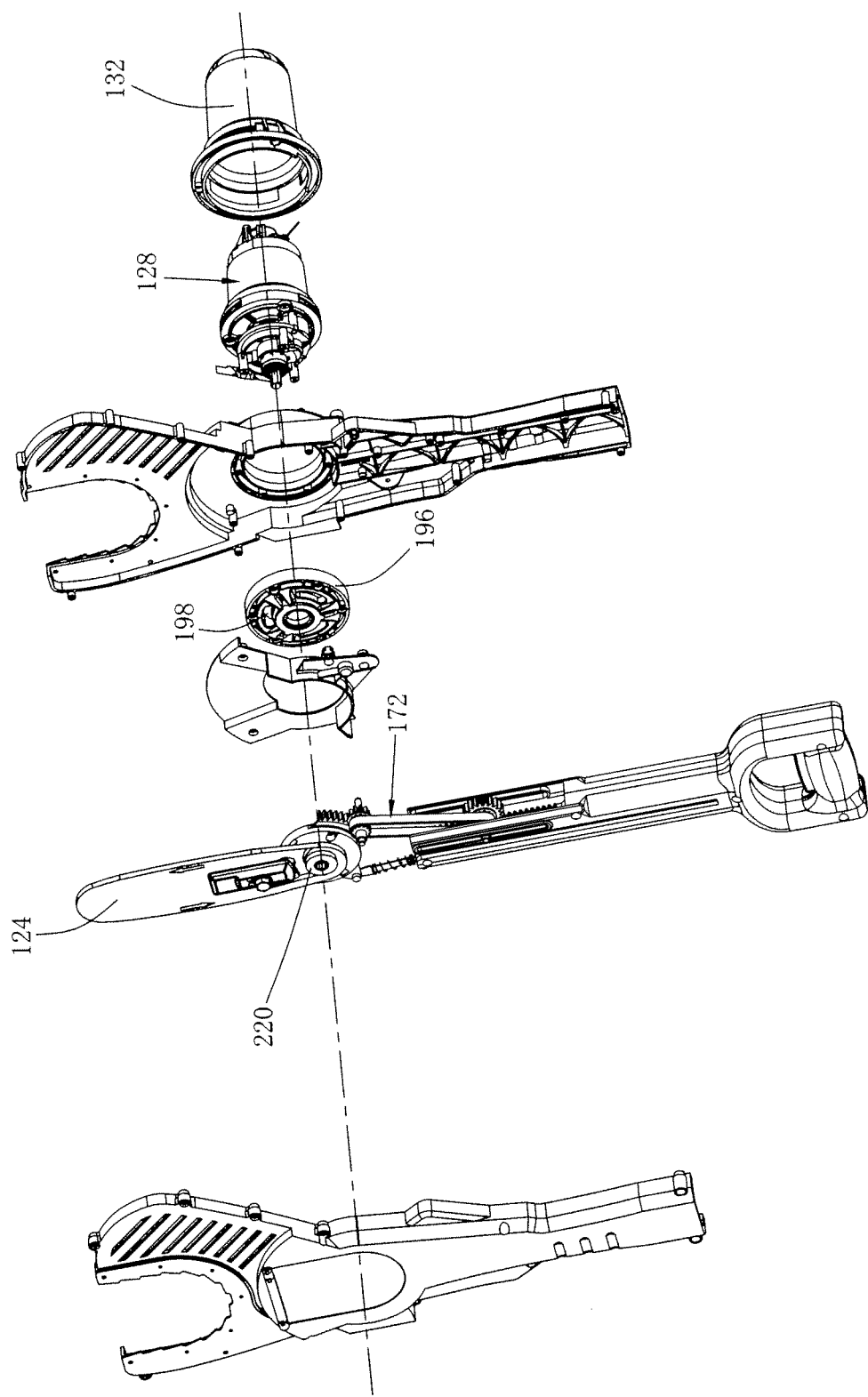
FIG. 13 is an exploded view of the chain saw according to FIG. 10.
Figure 14:
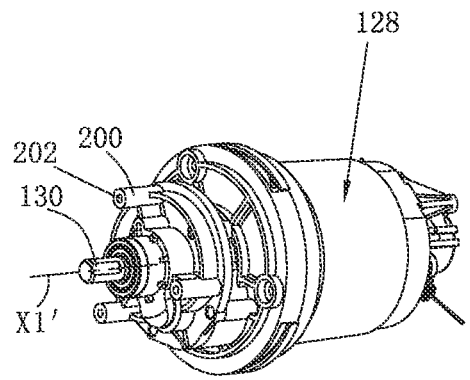
FIG. 14 is a schematic view of the motor of the chainsaw according to FIG. 10.

Further referring to FIG. 12, FIG. 13 and FIG. 14, the chain saw 10' also comprises a motor 128 for driving the working head 122 and enabling the flexible chain 126 to rotate around the guide bar 124. The motor 128 has a motor output shaft 130 which has a motor output shaft axis X1' and rotates around the motor output shaft axis X1' so as to drive the flexible chain 126 to rotate around the guide bar 124. The motor 128 is accommodated in a motor housing 132.

Figure 15:
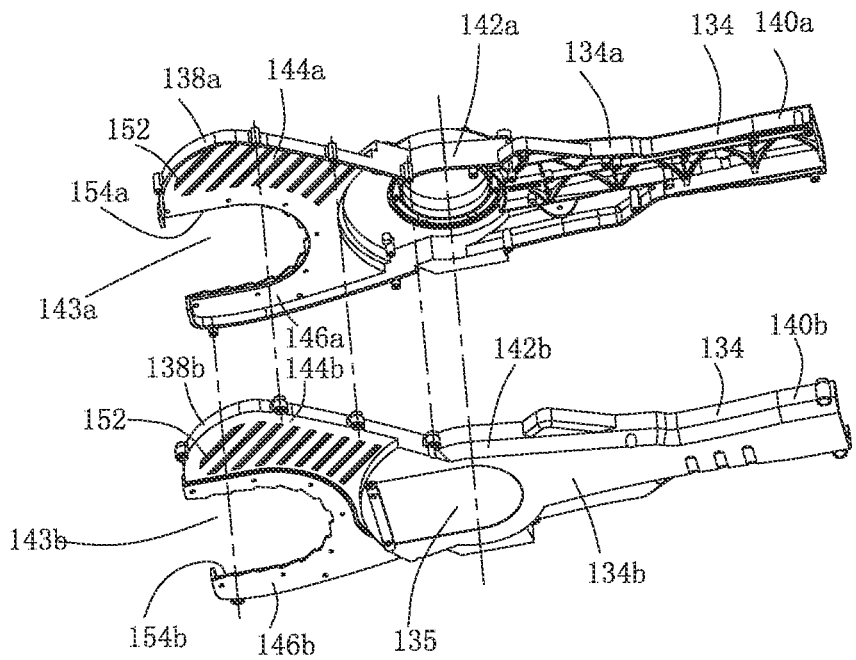
FIG. 15 is an exploded view of the main housing of the chain saw according to FIG. 10.

Further referring to FIG. 15, the chain saw 10' comprises a main housing 134 consisting of two semi-housings, a first semi-housing 134a and a second semi-housing 134b respectively, which can be detachably connected through screws. In the other embodiments of the invention, the connection modes of the first semi-housing 134a and the second semi-housing 134b may be others means to those people who skilled in the field, for example, integral formed, or Snap-fit etc. The motor housing 132 can be detachably connected to the first semi-housing 134a. In one embodiment of the invention, the motor housing 132 is connected to the first semi-housing 134a through screws.

The chain saw 10' comprises a housing cover 135, and an access hole (not shown in figure) is formed on the second semi-housing 134b to guarantee that a user exchange the flexible chain 126 conveniently. In the embodiment, the housing cover 135 is fixed to the second semi-housing 134b pivotally. In other embodiments of the invention, the housing cover 135 is connected to the second semi-housing 134b by others means which the people who skilled in the field known. When the flexible chain 126 is not required to be exchanged, the housing cover 135 covers the access hole. When the flexible chain 126 is required to be exchanged, the user can open or dismantle the housing cover 135 from the second semi-housing 134b through tools such as a wrench.

The chain saw 10' comprises a handle assembly 136 (as shown in FIG. 10, FIG. 11 or FIG. 12) for being held by an operator during use. As shown in FIG. 15, the first semi-housing 134a comprises a first working head accommodating end 138a, a first handle accommodating end 140a, and a first connection part 142a for connecting the first working head accommodating end 138a and the first handle accommodating end 140a. The second semi-housing 134b comprises a second working head accommodating end 138b, a second handle accommodating end 140b, and a second connection part 142b for connecting the second working head accommodating end 138b and the second handle accommodating end 140b.

Both the first working head accommodating end 138a and second working head accommodating end 138b are approximately U-shaped. The first working head accommodating end 138a has a first U-shaped opening 143a. The second working head accommodating end 138b has a second U-shaped opening 143b.

The first working head accommodating end 138a and the second working head accommodating end 138b together form a U-shaped protective hood 138 (as shown in FIG. 10) which is used for accommodating the working head 122.

The first working head accommodating end 138a comprises a first upper lateral wall 144a and a first lower lateral wall 146a. The first U-shaped opening 143a is defined between the first upper lateral wall 144a and the first lower lateral wall 146a. The second working head accommodating end 138b comprises a second upper lateral wall 144b and a second lower lateral wall 146b. A second U-shaped opening 143b is defined between the second upper lateral wall 144b and the second lower lateral wall 146b.

A first accommodating space 148 (as shown in FIG. 10) is formed between the first upper lateral wall 144a and the second upper lateral wall 144b. A second accommodating space 150 (as shown in FIG. 10) is formed between the first lower lateral wall 144b and the second lower lateral wall 146b. The first accommodating space 148 and the second accommodating space 150 are used for accommodating the working head 122. The first upper lateral wall 144a and the second upper lateral wall 144b are provided with several openings 152 respectively, so that the operator can get a clear view of the current position of the working head through the openings 152.

The first working head accommodating end 138a has a first U-shaped inside edge 154a which is circularly arranged on the inner side of the first working head accommodating head 138a, namely on one side, close to the first U-shaped opening 143a, of the first working head accommodating end 138a, and a first U-shaped jaw 156a (as shown in FIG. 11) is detachably arranged on the first U-shaped inner edge 154a. The U-shaped jaw 156a comprises a plurality of teeth 158a arranged on the inner side of the first U-shaped jaw 156a. The first U-shaped jaw 156a is made of steel. The first U-shaped jaw 156a is connected to the first U-shaped inner edge 154a through a rivet.

The second working head accommodating end 138b has a second U-shaped inside edge 154b which is circularly arranged on the inner side of the second working head accommodating head 138b, namely on one side, close to the second U-shaped opening 143b, of the second working head accommodating head 138b, and a second U-shaped jaw 156b (as shown in FIG. 10) is detachably arranged on the second U-shaped inner edge 154b. The second U-shaped jaw 156b comprises a plurality of teeth 158b arranged on the inner side of the second U-shaped jaw 156b. The second U-shaped jaw 156b is made of steel. The second U-shaped jaw 156b is connected to the second U-shaped inner edge 154b through rivets.

The first U-shaped inside edge 154a and the second U-shaped inside edge 154b together form a U-shaped inside edge 154 of the U-shaped protective hood 138. The first U-shaped jaw 156a and the second U-shaped jaw 156b together form a U-shaped jaw 156 of the U-shaped protective hood 138. The U-shaped jaw 156 of the U-shaped protective hood 138 is detachably connected to the U-shaped inside edge 154 of the U-shaped protective hood 138. The above-mentioned U-shaped jaw 156 can be used for supporting against a workpiece to be cut as a supporting wall. Teeth 158a and 158b are circularly arranged on the inner side of the U-shaped jaw 156. The aim of setting the teeth 158a and 158b that, when slim twigs are cuted, the U-shaped jaw 156 with the teeth can reliably support the twigs and prevent the twigs from springing out.

Referring to FIG. 11 and FIG. 12, the motor housing 132 is connected to a first connection part 142a of the first semi-housing 134a through screws. Both the first handle accommodating end 140a of the first semi-housing 134a and the second handle accommodating end 140b of the second semi-housing 134b extend longitudinally, and connected through screws. The first handle accommodating end 140a of the first semi-housing 134a and the second handle accommodating end 140b of the second semi-housing 134b together form a handle accommodating end 140 of the main housing 134.

The handle accommodating end 140 has a handle accommodating chamber 159 formed between the first handle accommodating end 140a and the second handle accommodating end 140b for accommodating a handle assembly 136. The handle accommodating chamber 159 has a longitudinal extension axis X2', and the handle assembly 136 is accommodated in the handle accommodating chamber 159 and can be operated to move linearly along the longitudinal extension axis X2'.

Further referring to FIG. 10 and FIG. 11, the handle component 136 comprises a guide rod part 160 and a holding part 162, the guide rod part 160 is a slim rod and accommodated in the handle accommodating chamber 159, while the holding part 162 is approximately D-shaped. One side of the D-shaped holding part 162 is a straight holding edge 164. The other side of the D-shaped holding part 162 is an arc-shaped connection edge 166. The holding part 162 is connected with the guide rod part 160 through the connection edge 166. A control switch 168 electrically connected with a motor 128 for controlling the start and stop of the motor 128 is arranged on the inner side of the holding edge 164.

The guide rod part 160 is accommodated in the handle accommodating chamber 159 and can be operated to move linearly along the longitudinal extension axis X2' of the handle accommodating chamber 159.

A transmission device is arranged between the handle component 136 and the working head 122. In the embodiment, the transmission device connects the handle component 136 and the guide bar 124 and converts the linear motion of the handle component 136 into the pivot motion of the guide bar 124. In the embodiment, the transmission device is configured as a synchronous belt drive mechanism 172.

Figure 16:
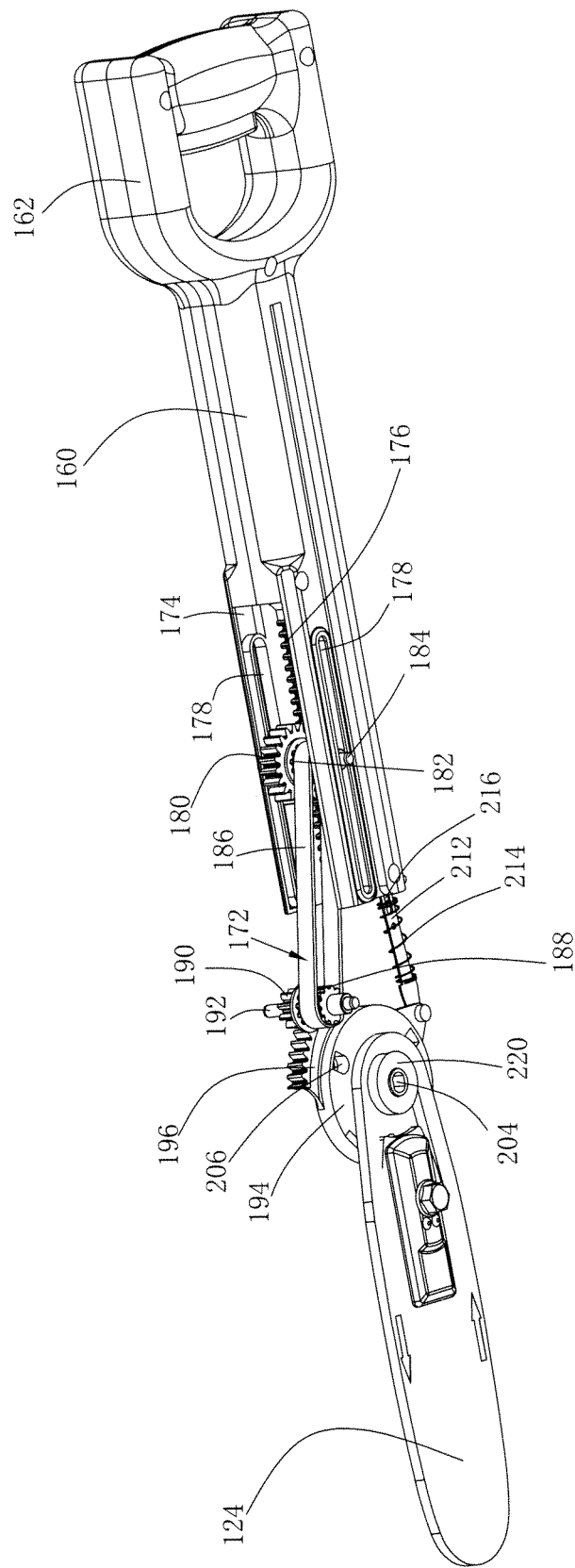
FIG. 16 is a perspective view of the synchronous belt drive mechanism of the chainsaw according to FIG. 10.

Referring to FIG. 16, one side, away from the holding part 162, of the guide rod part 160 is a drive part 174 with an approximate U-shaped cross section, a gear rack 176 is arranged on the bottom face of the U-shaped drive part 174, and a chute 178 is arranged on each of two sides of the U-shaped drive part 174.

The synchronous belt drive mechanism 172 comprises a drive gear 180 and a second drive gear 182. The first drive gear 180 and the second drive gear 182 are coaxially arranged and both fixedly supported on a first support shaft 184, and such connection makes the three rotate synchronously. Two ends of the first support shaft 184 pass through the chutes 178 respectively. Two accommodating holes (not shown) are formed on the first semi-housing 134a and the second semi-housing 134b respectively, and the two ends of the first support shaft 184 are accommodated in the two accommodating holes respectively. The two ends of the first support shaft 184 can relatively move along the chutes 178 with respect to the chutes 178 and can rotate in the two accommodating holes.

The first drive gear 180 is meshing engagement with the gear rack 176. When the guide rod part 160 of the handle component 136 moves linearly along the longitudinal extension axis X2' of the handle accommodating chamber 159, the gear rack 176 drives the first drive gear 180 to rotate, so the second drive gear 182 follows the first drive gear 180 to rotate.

The synchronous belt drive mechanism 172 further comprises a synchronous belt 186, a third drive gear 188, a fourth drive gear 190 and a second support shaft 192.

The third drive gear 188 and the fourth drive gear 190 are coaxially arranged and both fixedly supported on the second support shaft 192, and such connection makes the three rotate synchronously. Two accommodating holes (not shown) are formed on the first semi-housing 134a and the second semi-housing 134b respectively, and the two ends of the second support shaft 192 are accommodated in the two accommodating holes respectively and can rotate therein.

The synchronous belt 186 is mounted on the second drive gear 182 and the third drive gear 188, so when the second drive gear 182 rotates it drive the third drive gear 188 to rotate through the synchronous belt 186, and then the fourth drive gear 190 rotates together with the third drive gear 188.

The synchronous belt drive mechanism 172 further comprises a follower bracket 194 provided with a fan-shaped gear 196. The fan-shaped gear 196 is meshing engagement with the fourth drive gear 190, so when the fourth drive gear 190 rotates, the follower bracket 194 and the fan-shaped gear 196 rotate together with the fourth drive gear 190. In one embodiment of the invention, the follower bracket 194 is mounted on the motor output shaft 130 and can rotate around the output shaft 130 of the motor.

The guide bar 124 is fixedly connected with the follower bracket 194, so when the follower bracket 194 rotates around the motor output shaft 130, the guide bar 124 also rotates around the motor output shaft 130.

Figure 17:
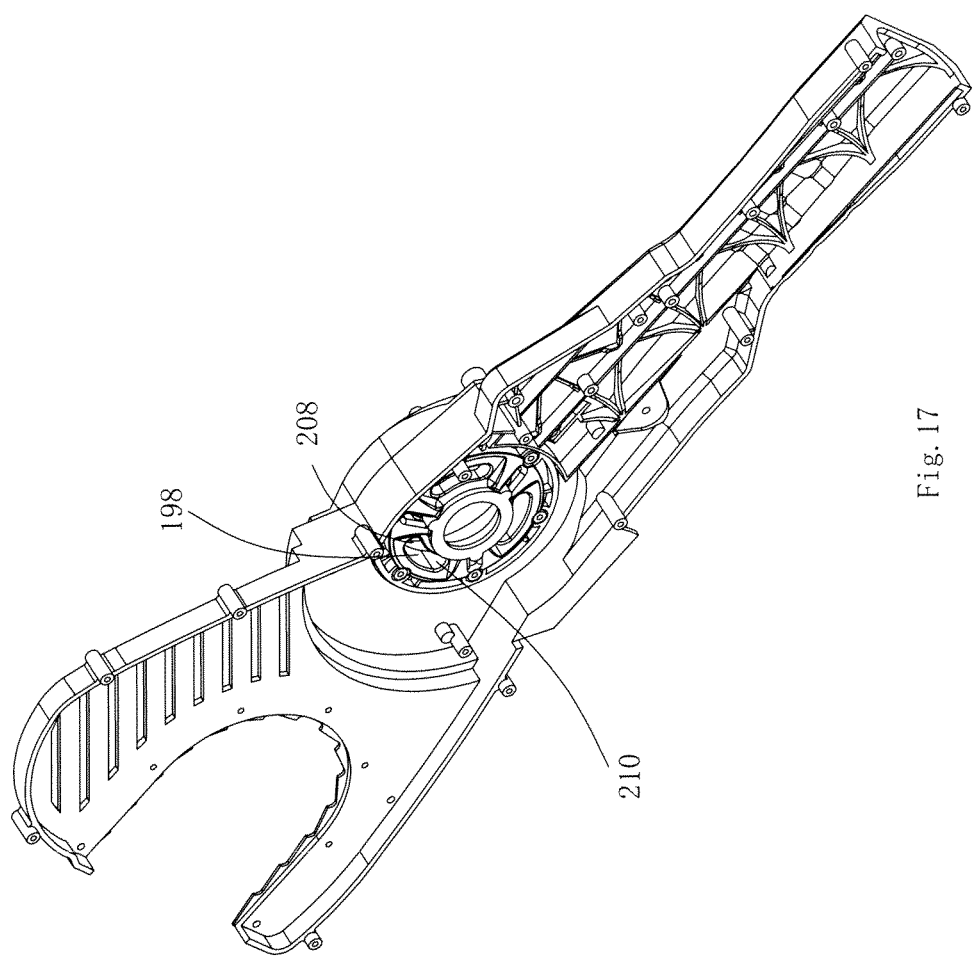
FIG. 17 is a perspective view of the limiting mechanism of the chainsaw according to FIG. 10.

Referring to FIG. 13 and FIG. 17, the chain saw 10' comprises a limiting mechanism for limiting the guide bar 124 rotating in excess so as to prevent the U-shaped protection hood 138 from damaging due to the rotation of the guide bar 124. The limited mechanism comprises a limited bracket 196 with a round cross section. Three waist-shaped grooves 198 are formed on the limited frame 196 along the circumference at equal interval, each of which extends along the circumference.

Referring to FIG. 14, three projected columns 200, extending from the upper edge of the end part of the motor 128 along the direction of the motor output shaft 130, are arranged at an equal interval along the circumference direction. An accommodating hole 202 is formed on each projected column 200. The three projected columns 200 pass through the three waist-shaped grooves 198 respectively and can rotate along the circumference direction therein.

Referring to FIG. 16, a mounting hole 204 is formed on the middle position of the follower bracket 194, the follower bracket 194 is sleeved on the motor output shaft 130 through the mounting hole 204. Three accommodating holes 206 are formed on the follower bracket 194 at an equal interval in the circumference direction and respectively aligned with the three accommodating holes 202 formed on the three project columns 200, such that a bolt can pass through the accommodating hole 206 and the accommodating hole 202 to fixedly connect the follower bracket 194 and the projected columns 200. The follower bracket 194 is fixedly connected with the guide bar 124, so the guide bar 124 is fixedly connected with the project columns 200, furthermore, the follower bracket 194 is fixedly connected to the motor 128, and such connection mode makes the follower bracket 194 rotate and drive the motor 128 to rotate together.

One end of each waist groove 198 is provided with a first stop face 208, while the other end is provided with a second stop face 210, the projected columns 200 are operated to move in the waist-shaped groove 198 and matched with the first stop face 208 and the second stop face 210 respectively. When the projected columns 200 are matched with the first stop face 208, the working head 122 is accommodated in the first accommodating space 148. When the guide bar 124 rotates to the top of the U-shaped protection hood 138 and the working head 122 keeps a certain distance away from the top of the U-shaped protection hood 138, so the working head 122 does not contact the top of the U-shaped protection hood 138. When the projected columns 200 are matched with the second stop face 210, the working head 122 is accommodated in the second accommodating space 150. When the guide bar 124 rotates to the bottom of the U-shaped protection hood 138 and the working head 122 keeps a certain distance away from the bottom of the U-shaped protection hood 138, so the working head 122 does not contact the bottom of the U-shaped protection hood 138.

A resilience mechanism is arranged between the second semi-housing 134b and the follower bracket 194. The resilience mechanism comprises a pin 212 and a spiral spring 214, one end of the pin 212 is pivoted with the follower bracket 194, the other end of the pin 212 is provided with a chute 216, and the second semi-housing 134b is provided with the projected columns (not shown in the figure) which are accommodated in the chute. The spiral spring 214 is mounted on the pin, one end of the spiral spring is supported against the projected columns, and the other end of the spiral spring 214 is pressed against the end of the pin 212 so as to be pressed against the follower bracket 194. The resilience mechanism is arranged to ensure that, whenever after the end of cutting, the working head 122 can automatically spring back to the initial position, which means the working head 122 springs back into the first accommodating space 148. The working head 122 is completely accommodated in the U-shaped protection hood 138, which guarantees the safety of operation.

The chain saw 10' comprises a drive mechanism positioned between the motor 128 and the working head 122 and used for transferring the power of the motor 128 to the working head 122. The drive mechanism comprises a chain wheel 220 disposed on the motor output shaft 130 and can, together with the motor output shaft 130 rotate around the axis X1' of the motor output shaft 130. The chain wheel 220 is meshing engagement with the flexible chain 126 to drive the flexible chain 126 to rotate around the guide bar 124.

The motor 128 can be started by manually pressing the control switch 168 during working, and then the motor output shaft 130 starts to rotate, the chain wheel 220 rotates together with the motor output shaft 130, and the chain wheel 220 rotates to drive the flexible chain 126 to rotate around the guide bar 124. Meanwhile, if the operator holds the holding part 162 of the handle component 136 and pushes the handle component 136 towards the working head 122, the guide rod part 160 linearly moves along the longitudinal extension axis X2' of the handle accommodating chamber 159, under the action of the synchronous belt drive mechanism 172, the guide bar 124 pivots around the axis X1' of the motor output shaft in the support plate plane, and thus cutting starts. The guide bar 124 is fixedly connected with the motor 128, so the pivot of the guide bar 124 drives the motor 128 to rotate together. In the embodiment, the handle component 136 is pushed towards the working head 122, so the guide bar 124 pivots to cut.

The Fifth Embodiment

FIG. 18 shows another embodiment, which is different from the fourth embodiment in that: the transmission device is configured as a plane multi-rod mechanism 230 comprising a connection rod 232. The connection rod 232 is positioned between the guide rod part 160 and the follower bracket 194 and hinged with the two respectively. The connection rod 232 comprises a first connection rod 234, a second connection rod 236 and a third connection rod 238. When the operator pushes the holding 162 towards the working head 122, the guide rod part 160 linearly moves along the longitudinal extension axis X2' of the handle accommodating chamber 159. The follower bracket 194 is fixedly connected with the guide bar 124, and the first connection rod 234, the second connection rod 236 and the third connection rod 238 are positioned between the guide rod part 160 and the follower bracket 194. One end of the first connection rod 234 is hinged with the guide rod part 160 of the handle component 136. The other end of the first connection rod 234 is hinged with one end of the second connection rod 236, and the other end of the second connection rod 236 can be relatively pivoted with the first semi-housing 134a. One end of the third connection rod 238 is hinged with the middle part of the second connection rod 236, while the other end of the third connection rod 238 is hinged with the follower bracket 194. The embodiment ensures that, when the handle component 136 is pushed towards the working head 122, the guide bar 124 pivots to cut.

The invention claimed is:

1. A vegetation pruning device, comprising:
   a cutting element;
   a guide bar for supporting the cutting element, the guide bar having a guide bar plane, the guide bar being pivotable in the guide bar plane about a fixed axis;
   a motor having a motor shaft for rotatably driving the cutting element;
   a motor housing for receiving the motor;
   a guiding mechanism connected to the motor housing, the guiding mechanism having a longitudinal axis;
   a handle assembly operable to move linearly along the longitudinal axis; and
   a transmission device for connecting the handle assembly to the guide bar, the transmission device converting a linear movement of the handle assembly to a pivoting movement of the guide bar, the cutting element thereby approaching or withdrawing from a work piece to be sawn.

2. A vegetation pruning device according to claim 1, wherein the transmission device is configured as a crank mechanism.

3. A vegetation pruning device according to claim 2, wherein the crank mechanism comprises a driving part, a connecting part and a driven part, wherein the driving part is operable by the handle assembly, wherein the driven part is fixedly attached to the guide bar, wherein the connecting part is interposed between the driving part and the driven part, and wherein the connecting part is hinged to the driving part and to the driven part, respectively.

4. A vegetation pruning device according to claim 3, wherein the driven part is configured as V-shaped, wherein one side portion of the V-shaped driven part is hinged to the connecting part, wherein another side portion of the V-shaped driven part is fixedly secured to the guide bar, and wherein a bottom portion of the V-shaped driven part is pivotable about the fixed axis.

5. A vegetation pruning device according to claim 1, wherein the fixed axis is configured as the motor shaft axis.

6. A vegetation pruning device according to claim 1, comprising a driving device, the driving device is positioned between the motor shaft and the cutting element, wherein the driving device includes a sprocket having a sprocket rotation axis, wherein the sprocket is in meshing engagement with the cutting element so that the cutting element is running around the guide bar and the sprocket, and wherein the fixed axis is the sprocket rotation axis.

7. A vegetation pruning device according to claim 1, wherein the handle assembly comprises an extended front portion and a gripping portion.

8. A vegetation pruning device according to claim 7, wherein the front portion is configured as a longitudinal extension rod.

9. A vegetation pruning device according to claim 7, wherein the gripping portion is configured as D-shaped.

10. A vegetation pruning device according to claim 8, wherein the guiding mechanism is configured as a longitudinal extension tube having a longitudinal axis, wherein the extension rod is movably received in the longitudinal extension tube, so that the rod can move linearly along the longitudinal axis of the longitudinal extension tube.

11. A vegetation pruning device according to claim 10, wherein a locking device is associated with the longitudinal extension tube and the front portion.

12. A vegetation pruning device according to claim 9, wherein a control switch is built into the D-shaped gripping portion.

13. A vegetation pruning device according to claim 9, wherein a safety switch is symmetrically attached to both outer ends of the D-shaped gripping portion.

14. A vegetation pruning device according to claim 1, wherein the vegetation pruning device comprises a U-shaped guard.

15. A vegetation pruning device according to claim 14, wherein the guard comprises a first receiving room and a second receiving room, and wherein the cutting element is completely insertable into the first receiving room.

16. A vegetation pruning device according to claim 15, wherein the cutting element is at least partially insertable into the second receiving room.

17. A vegetation pruning device according to claim 14, wherein the U-shaped guard comprises a first supporting edge and a second supporting edge, which are connected to each other by a third supporting edge, and wherein the first, second and third supporting edges define together a U-shaped supporting edge.

18. A vegetation pruning device according to claim 14, wherein the U-shaped guard comprises a first end surface and a second end surface, wherein the first end surface and the second end surface have a common plane, wherein a supposed plane is perpendicular to the longitudinal axis, wherein the fixed axis is positioned in the supposed plane, wherein the longest distance between the points of the outermost portion of the cutting element and the supposed plane is less than or equal to the distance between the common plane of the first end surface and the second end surface and the supposed plane.

19. A vegetation pruning device according claim 1, wherein the transmission device is configured as a rack and pinion mechanism, the rack and pinion mechanism comprising a gear fixedly secured to the guide bar, and comprising a rack fixedly secured to the handle assembly, wherein the gear is in meshing engagement with the rack so that a linear movement of the rack can be changed to a pivotable movement of the gear.

20. A vegetation pruning device according to claim 1, wherein the transmission device is configured as a pulley mechanism, wherein the pulley mechanism includes a pulley and a rope, wherein the rope is mounted on the pulley, one end of the rope being fixed to the handle assembly, the other end of the rope being fixed to the motor housing, and wherein the pulley is fixedly coupled to the guide bar, so that a linear movement of the handle assembly can be changed to a pivotable movement of the guide bar.

21. A vegetation pruning device according to claim 1, wherein the transmission device is associated with the motor and operable to drive the motor and the guide bar to move together.

22. A vegetation pruning device according to claim 21, wherein the transmission device is configured as a synchronous belt drive mechanism.

23. A vegetation pruning device according to claim 22, wherein the handle assembly comprises a gear rack, and the synchronous belt drive mechanism comprises a drive gear which meshes with the gear rack.

24. A vegetation pruning device according to claim 22, wherein the synchronous belt drive mechanism comprises a follower bracket, and the guide bar is fixedly secured to the follower bracket.

25. A vegetation pruning device according to claim 24, wherein the follower bracket is fixedly secured to the motor, thereby the motor rotates together with the follower bracket when the follower bracket rotates.

26. A vegetation pruning device according to claim 21, further comprising a limiting mechanism for preventing the guide bar rotating to excess.

27. A vegetation pruning device according to claim 26, wherein the limiting mechanism comprise a limited bracket with three waist-shaped grooves formed along the circumference at equal intervals, and the motor comprises three projected columns formed at one end along the circumference at equal intervals, the three projected columns extending along the motor shaft and passing through the three waist-shaped grooves respectively.

28. A vegetation pruning device according to claim 21, further comprising a resilience mechanism.

29. A vegetation pruning device according to claim 28, further comprising a main housing, the transmission device being configured as a synchronous belt drive mechanism, the synchronous belt drive mechanism comprising a follower bracket, the resilience mechanism comprising a pin and a spiral spring, one end of the spiral spring being connected with the follower bracket pivotally, the other end of the spiral spring being provided with a chute, the main housing comprising a projected column accommodated in the chute, the spiral spring being mounted on the pin, one end of the spiral spring supported against the projected columns, the other end of the spiral spring being pressed against the end of the pin so as to be pressed against the follower bracket.

30. A vegetation pruning device according to claim 21, wherein the transmission device is configured as a plane multi-rod mechanism.

* * * * *

UNITED STATES PATENT AND TRADEMARK OFFICE
CERTIFICATE OF CORRECTION

Page 1 of 1

PATENT NO.        : 9,032,630 B2
APPLICATION NO.   : 13/202546
DATED             : May 19, 2015
INVENTOR(S)       : Warren Brown et al.

It is certified that error appears in the above-identified patent and that said Letters Patent is hereby corrected as shown below:

On the Title Page:

At item (58), line 2, "B27B 19/003" should be -- B27G 19/003 --.

In the Claims:

At Column 15, Line 7, Claim 18, "according claim" should be -- according to claim --.

Signed and Sealed this
Twenty-third Day of February, 2016

Michelle K. Lee
*Director of the United States Patent and Trademark Office*